(12) United States Patent
Park

(10) Patent No.: US 9,273,977 B2
(45) Date of Patent: Mar. 1, 2016

(54) METHOD OF SETTING VIA-POINT IN NAVIGATION SYSTEM

(71) Applicant: Hyundai Motor Company, Seoul (KR)

(72) Inventor: Dae Ro Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/477,082

(22) Filed: Sep. 4, 2014

(65) Prior Publication Data

US 2015/0233723 A1   Aug. 20, 2015

(30) Foreign Application Priority Data

Feb. 20, 2014 (KR) .................. 10-2014-0019391

(51) Int. Cl.
*G01C 21/00* (2006.01)
*G01C 21/34* (2006.01)

(52) U.S. Cl.
CPC .................................. *G01C 21/3438* (2013.01)

(58) Field of Classification Search
CPC .... G01C 21/36; G01C 21/26; G01C 21/3688; G01C 21/3611; G01C 21/3632
USPC ........................................................ 701/538
See application file for complete search history.

(56) References Cited

U.S. PATENT DOCUMENTS

2012/0253654 A1   10/2012   Sun et al.

FOREIGN PATENT DOCUMENTS

| JP | 2005-083864 A |   | 3/2005 |
|---|---|---|---|
| JP | 200583791 | * | 3/2005 |
| KR | 10-2004-0038517 |   | 5/2004 |
| KR | 10-2005-0062320 |   | 6/2005 |
| KR | 10-2009-0123475 A |   | 12/2009 |
| KR | 10-1241610 B1 |   | 3/2013 |
| KR | 10-2013-0111801 |   | 10/2013 |

* cited by examiner

*Primary Examiner* — Maceeh Anwari
(74) *Attorney, Agent, or Firm* — Mintz Levin Cohn Ferris Glovsky and Popeo, P.C.; Peter F. Corless

(57) ABSTRACT

The present disclosure relates to a method of setting a via-point in a navigation system. The method includes: inputting a plurality of starting places including a starting place of a driver and a starting place of a fellow passenger; when the starting place of the fellow passenger is selected as a via-point, searching for a route from the starting place of the driver to the destination of the driver and including the via-point; and when the starting place of the fellow passenger is not selected as the via-point, inputting various preferred traffic information about the fellow passenger, and calculating an optimum via-point for the fellow passenger to be included within a travelling route from the starting place of the driver to the destination of the driver.

9 Claims, 4 Drawing Sheets

METHOD OF SETTING VIA-POINT IN NAVIGATION SYSTEM

CROSS-REFERENCE TO RELATED APPLICATION

This application claims under 35 U.S.C. §119(a) priority to and the benefit of Korean Patent Application No. 10-2014-0019391 filed on Feb. 20, 2014, the entire contents of which are incorporated herein by reference.

BACKGROUND (a) Technical Field

The present disclosure relates to a method of setting a via-point in a navigation system. More particularly, it relates to a method of setting a via-point in a navigation system, by which an optimum via-point for picking a fellow passenger up may be calculated in the event that starting places of a driver and the fellow passenger are different from each other.

(b) Background Art

As is well known, when a customer inputs a starting place, a via-point (optional), and a destination into a navigation device installed in a vehicle or as a portal site, map information of the navigation device provides the customer with an optimum route. As illustrated in FIG. 1, when a driver or a user inputs a starting place, a via-point (optional), and a destination, a plurality of recommended routes is generated considering map information (e.g., traffic and road information), and the driver (or the user) can select one route to drive the vehicle.

Sometimes a case occurs where a driver has an additional passenger that, for example, allows a driver to use a car pool lane while driving the vehicle with a navigation device mounted inside a vehicle. In such case, it may be better if the driver picks the fellow passenger up at a starting place of the fellow passenger while travelling to the destination of the driver. But, in the case where the starting place of the fellow passenger is considerably different from a starting place of the driver, an optimum via-point for considering the fellow passenger needs to be set. In the case where a third via-point, that is, an optimum via-point, needs to be set for the consideration of the fellow passenger, the driver needs to search for the optimum via-point considering traffic information, or preferred public transportation and convenience for the fellow passenger. However, a navigation system cannot gather various information and preferred information about the fellow passenger, making it difficult to search for an optimum via-point for the fellow passenger.

In order to solve these inconveniences, a method of setting a via-point by using an intelligent transport system (ITS) and various information has been demanded.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The disclosed embodiments have been made in an effort to solve the above-described problems associated with related art, and provide a method of setting a via-point in a navigation system, in which a common destination and different starting places of a driver and a fellow passenger are input, preferred traffic information for a movement of the fellow passenger to a selected via-point is simultaneously input, and then an optimum via-point is searched so that the fellow passenger may conveniently ride in a vehicle within a travelling route from the starting place to a destination of the driver to reach the destination in a short time.

According to embodiments of the disclosure, the present disclosure provides a method of setting a via-point in a navigation system, including: inputting a plurality of starting places including a starting place of a driver and a starting place of a fellow passenger; receiving an indication of a selection of a via-point; when the starting place of the fellow passenger is selected as the via-point, searching for a route from the starting place of the driver to the destination of the driver and including the via-point; and when the starting place of the fellow passenger is not selected as the via-point, inputting various preferred traffic information about the fellow passenger, and calculating an optimum via-point for the fellow passenger to be included within a travelling route from the starting place of the driver to the destination of the driver.

According to embodiments of the disclosure, the calculating of the optimum via-point may include: inputting preferred traffic information containing preferred transportation means for a movement of the fellow passenger to the selected via-point, the number of times of transit of the transportation means, and an allowed via-point radius based on a basic recommended route; searching for a travelling route from the starting place of the driver to the destination of the driver; obtaining transportation means information within the travelling route from the starting place of the driver to the destination of the driver; and comparing the obtained transportation means information with the inputted preferred traffic information about the fellow passenger, and inquiring and selecting the optimum via-point for the fellow passenger.

According to embodiments of the disclosure, the inquiring and the selecting of the optimum via-point may include selecting a position containing transportation means information matched to the preferred transportation means and the number of times of transit to the via-point for the fellow passenger within the allowed via-point radius from the basic recommended route among the obtained transportation means information as the optimum via-point.

According to embodiments of the disclosure, after the calculating of the optimum route, when it is determined that the selected optimum via-point is appropriate, information on the preferred transportation means and the transit of the transportation means may be displayed on the screen of the navigation system together with the position of the optimum via-point, and then a travelling route including the optimum via-point may be displayed on the screen of the navigation system.

According to embodiments of the disclosure, after the calculating of the optimum via-point, the optimum via-point, the transportation means for the movement to the via-point, and a time taken to the via-point may be notified to the fellow passenger.

According to embodiments of the disclosure, after the calculating of the optimum route, when it is determined that the selected optimum via-point is inappropriate, information on preferred transportation means and the transit of the transportation means included in an alternative via-point may be displayed on the screen of the navigation system together with a position of the alternative via-point, and then a travelling route including the alternative via-point may be displayed on the screen of the navigation system.

According to embodiments of the disclosure, after the calculating of the optimum via-point, when it is determined that the selected optimum via-point is inappropriate, the alternative via-point, the transportation means for the movement to the alternative via-point, and the time taken to the alternative via-point may be notified to the fellow passenger.

According to embodiments of the disclosure, the method may further include, when the fellow passenger is not satisfied with the alternative via-point, re-inputting the allowed via-point radius based on the basic recommended route, and calculating another via-point for the fellow passenger.

Through the aforementioned technical solutions, the present disclosure provides a variety of advantageous effects. In particular, different starting places of a driver and a fellow passenger are inputted together with a common destination of the driver and the fellow passenger, and preferred traffic information for a movement of the fellow passenger to a selected via-point is input, so that the driver may receive guidance of an optimum via-point, at which the fellow passenger conveniently rides in a vehicle during travelling from the starting place to the destination of the driver to reach the destination within a short time.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure, and wherein.

Figure 1:
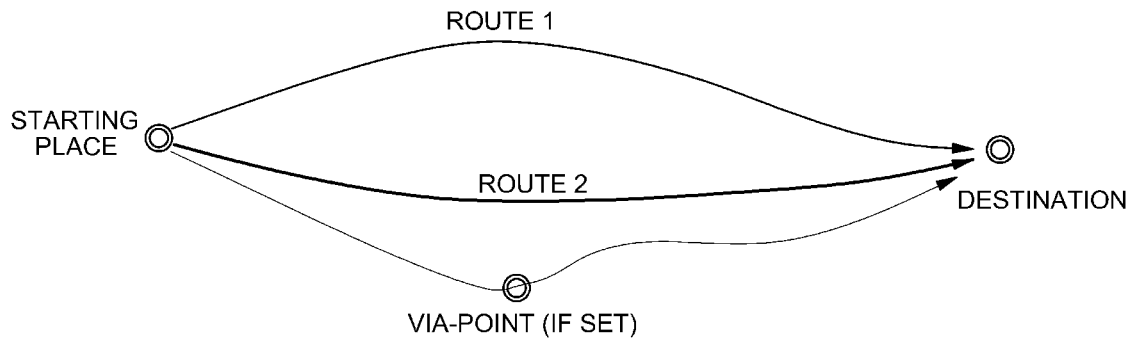
FIG. 1 is a conceptual diagram illustrating a general example of a route calculation of a navigation system.

It should be understood that the appended drawings are not necessarily to scale, presenting a somewhat simplified representation of various preferred features illustrative of the basic principles of the present disclosure. The specific design features of the embodiments as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the contents of the present disclosure will be described in conjunction with exemplary embodiments, it will be understood that the present disclosure is not intended to limit the invention to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one control unit. The term "control unit" may refer to a hardware device that includes a memory and a processor. The memory is configured to store program instructions, and the processor is configured to execute the program instructions to perform one or more processes which are described further below.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying drawings.

Figure 2:
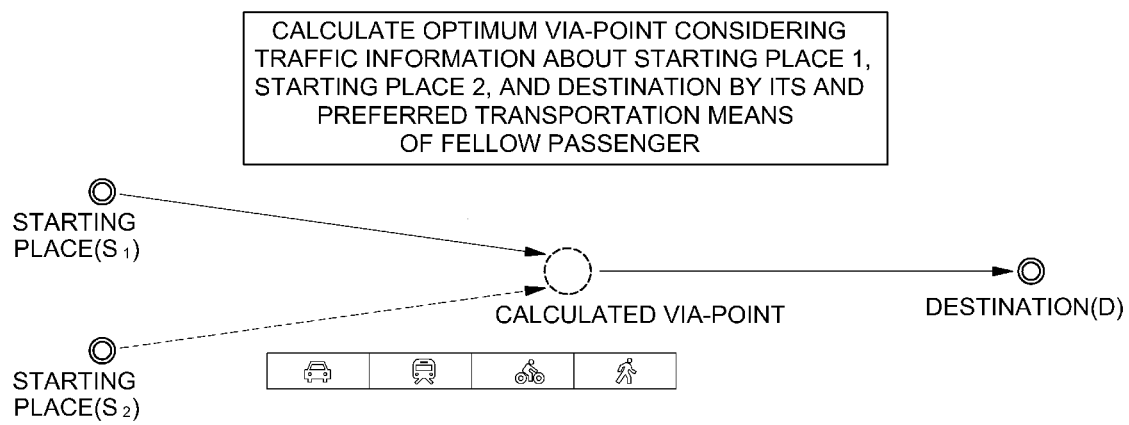
FIG. 2 is a conceptual diagram illustrating a method of setting a via-point in a navigation system according to the present disclosure.

As illustrated in a conceptual diagram of FIG. 2, the present disclosure describes a method, in which a common destination and different starting places of a driver and a fellow passenger are inputted, and preferred traffic information for a movement of the fellow passenger to a selected via-point is simultaneously inputted, such that an optimum via-point is searched so that the fellow passenger conveniently takes a vehicle within a travelling route from the starting place to a destination of the driver to reach the destination within a short time.

Figure 3:
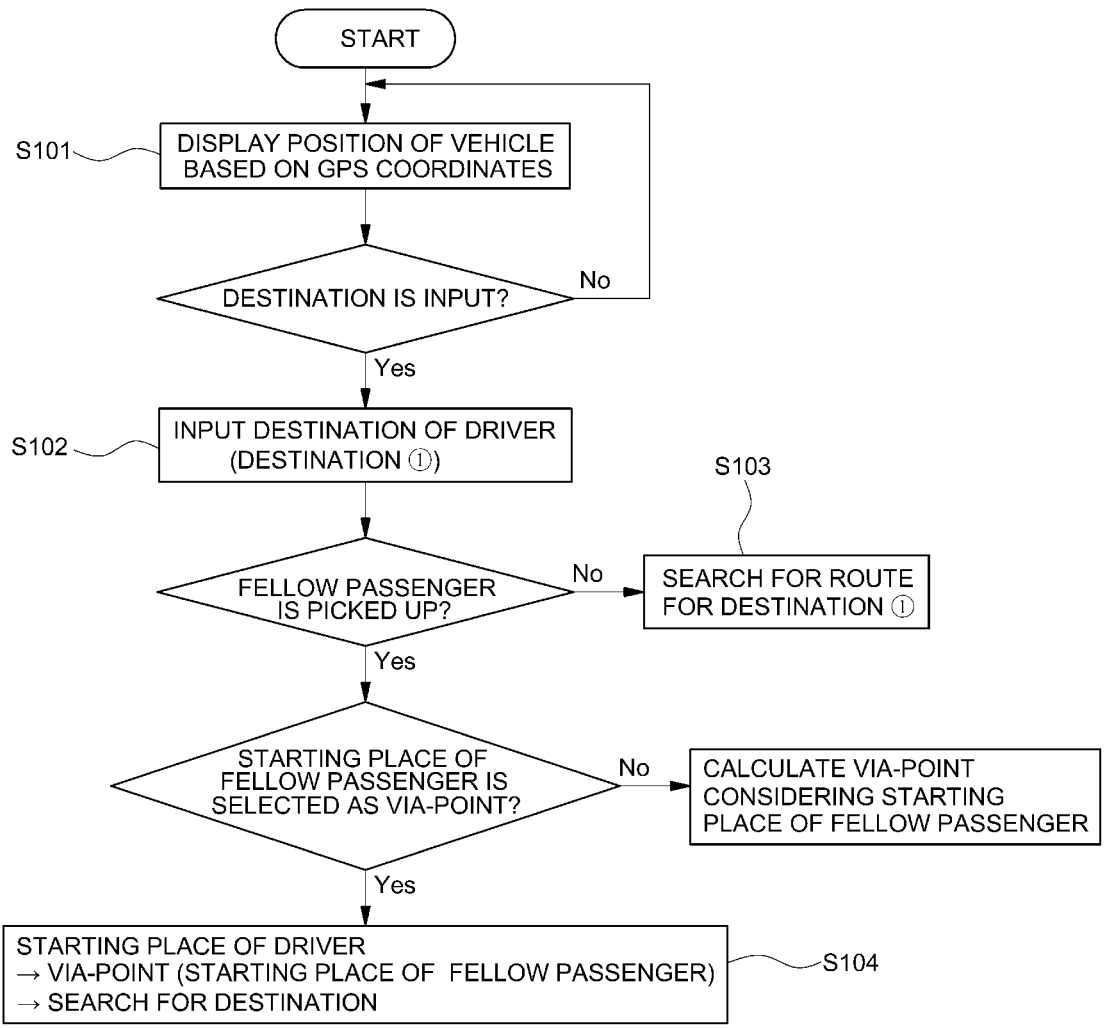
FIGS. 3 and 4 are flowcharts illustrating the method of setting a via-point in the navigation system according to the present disclosure.
Figure 4:
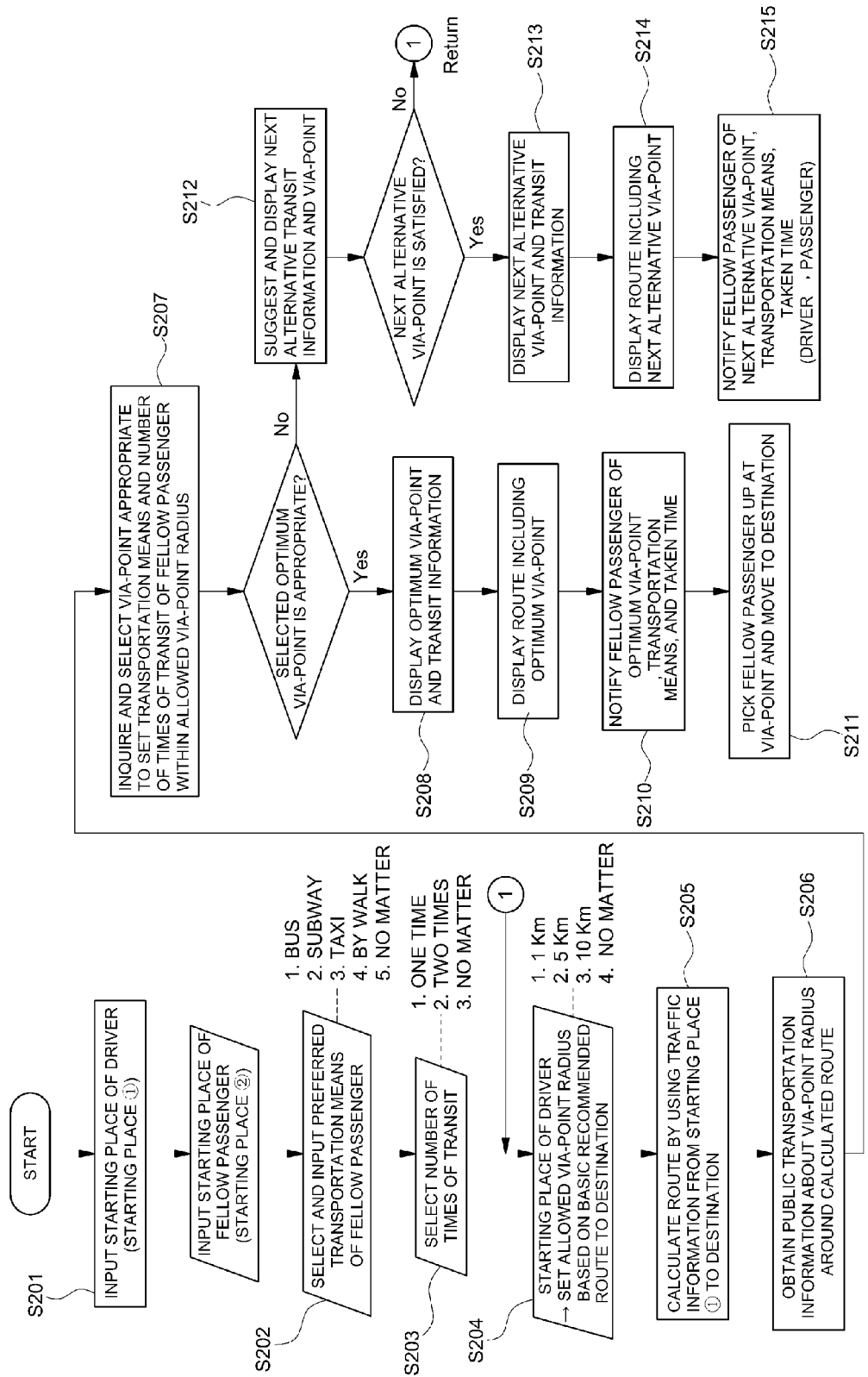

FIGS. 3 and 4 are flowcharts illustrating a method of setting a via-point in a navigation system according to the present disclosure. First, when a navigation system is operated and a vehicle position by a global positioning system (GPS) is displayed on a screen (S101), the navigation system enters a state where a travelling destination is selectable, so that a driver inputs his/her destination (S102). In this case, in the case where there is no fellow passenger, a travelling route for the destination input by the driver is searched (S103). However, in the case where there is a fellow passenger, when the driver inputs a starting place of the fellow passenger, and simultaneously sets the inputted starting place of the fellow passenger as a via-point, a travelling route appropriate to "the starting place (starting place of the driver)→the via-point (starting place of the fellow passenger)→the destination of the driver and the fellow passenger" is searched (S104).

When there is a fellow passenger, and the starting place of the fellow passenger is considerably different from the starting place of the driver even though there is the fellow passenger, an optimum via-point for considering the fellow passenger is selected. That is, a third via-point, e.g., the optimum via-point, for considering the fellow passenger within the travelling route from the starting place to the destination of the driver is selected, so that the driver may be guided to the third via-point, at which the fellow passenger may conveniently take the vehicle along the travelling route from the starting place to the destination of the driver to reach the destination within a short time.

Referring to the method of calculating the optimum via-point, the optimum via-point is a via-point selected for considering the fellow passenger along the travelling route from the starting place to the destination of the fellow passenger considering various preferred traffic information about the fellow passenger.

First, a plurality of starting places including the starting place of the driver and the starting place of the fellow passenger is input to the navigation system (S201), and various preferred traffic information about the fellow passenger for calculating an optimum via-point is inputted. The inputting of the various preferred traffic information about the fellow passenger includes inputting a preferred transportation means, which the fellow passenger will use while moving to a selected via-point (S202), inputting the number of times of transit of the transportation means (S203), inputting an allowed via-point radius (e.g., a region selectable as an optimum via-point) based on a basic recommended route (e.g., see FIG. 5A) from the starting place to the destination of the driver (S204). The preferred transportation means may be divided into items, for example, a bus, a subway, a taxi, by walk, "no matter" (i.e., the user does not indicate a preference), and the like, to be inputted, the number of times of transit of the transportation means may be divided into one time, two times, no matter, and the like to be inputted, and the via-point radius may be divided into increments of 1 km, 5 km, 10 km, and the like.

Figure 5:
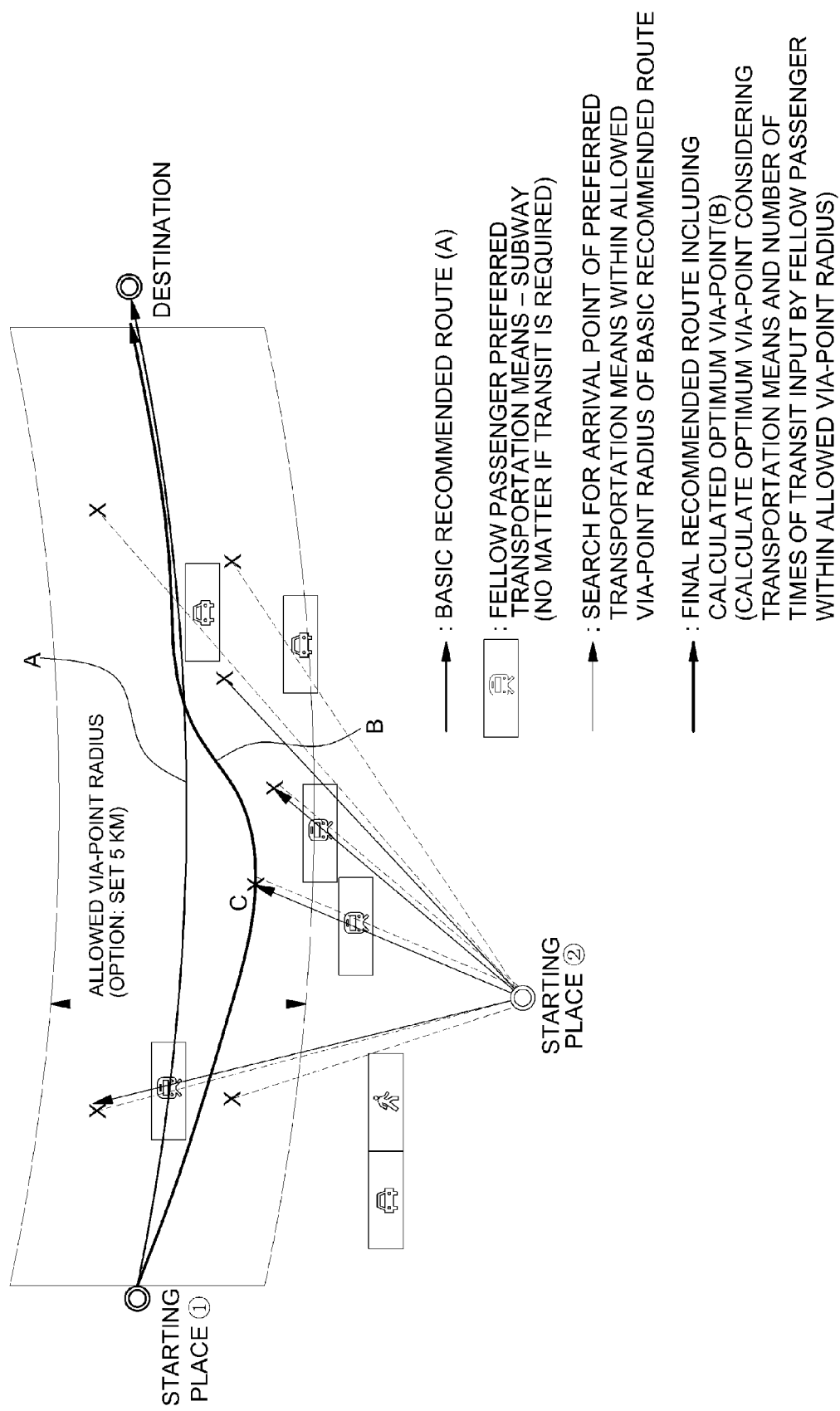
FIG. 5 is a schematic diagram illustrating an example of a travelling route in the case where an optimum via-point for considering a fellow passenger is set according to the present disclosure.

As illustrated in FIG. 5, the basic recommended route is a travelling route basically provided when the starting place and the destination of the driver are input to the navigation system, and the allowed via-point radius set based on the basic recommended route is for the purpose of limiting a region, which is selectable as the optimum via-point considering the fellow passenger, and configures a region, which is selectable as the optimum via-point, within a predetermined distance based on the basic recommended route. Next, the travelling route by using traffic information from the starting place to the destination of the driver is searched (S205), so that the driver travels according to the searched travelling route. Next, transportation means information is obtained within the travelling route from the starting place to the destination of the driver, preferably, within the allowed via-point radius from the previously provided basic recommended route (S206).

For reference, the navigation system may obtain the traffic information, the transportation means information, and the like from an external server through a telematics system. Subsequently, it is compared and determined whether information matched to the previously inputted preferred traffic information about the fellow passenger is contained in the obtained transportation means information, and an optimum via-point for the fellow passenger is inquired and selected (S207). More particularly, in the inquiring and the selecting of the optimum via-point, it is determined whether the transportation means information matched to the preferred transportation means and the number of times of transit of the transportation means to the via-point for the fellow passenger within the allowed via-point radius from the previously input basic recommended route is contained in the obtained transportation means information, and then a position including appropriate transportation means information matched to the preferred transportation means and the number of times of transit of the transportation means is selected as the optimum via-point.

Referring to FIG. 5, for example, the fellow passenger may input a subway as the preferred transportation means, "no matter" as the number of times of transit of the transportation means, and 5 km as the allowed via-point radius, it is determined whether the input transportation means information is included in the obtained transportation means information, and then a position including the transportation means information matched to the preferred transportation means and the number of times of transit of the transportation means is selected as an optimum via-point C. When it is determined that the selected optimum via-point is appropriate, that is, when the selected optimum via-point is satisfied as a via-point matched to the transportation means and the number of times of transit of the transportation means desired by the fellow passenger, information on the preferred transportation means and the transit is displayed on a screen of the navigation system together with the position of the optimum via-point (S208), and then a travelling route including the optimum via-point is displayed as a final recommended route (e.g., see FIG. 5B) to the destination.

That is, the travelling route (e.g., the final recommended route) from the starting place of the driver to the destination is displayed on the screen of the navigation system, and in this case, the final recommended route includes the optimum via-point as the position at which the fellow passenger takes the vehicle of the driver. Accordingly, the driver drives toward the optimum via-point selected as described above, and notifies the fellow passenger of the final via-point, the transportation means to be used to the via-point, and a time taken to the via-point (S210). When the driver arrives at the final via-point, the driver picks the fellow passenger up, and then drives toward the destination again (S211).

In the meantime, when it is determined that the selected optimum via-point is inappropriate, that is, when it is determined that the fellow passenger is not satisfied with a part of the transportation means and the number of times of the transit of the transportation means, information on the preferred transportation means and the transit included in an alternative (e.g., second) via-point is suggested on the screen of the navigation system together with a position of the next alternative via-point (S212). Next, when the fellow passenger is satisfied with the alternative via-point, information on the preferred transportation means and the transit contained in the alternative via-point is continuously displayed on the screen of the navigation screen (S213), and then a travelling route including the alternative via-point is displayed on the screen (S214).

Accordingly, the driver drives toward the alternative via-point selected as described above, and notifies the fellow passenger of the alternative via-point, the transportation means to be used to the alternative via-point, and a time taken to the alternative via-point (S210). In the meantime, when the fellow passenger is not satisfied with even the alternative via-point, the process of re-inputting an allowed via-point radius based on the basic recommended route from the starting place to the destination of the driver, and calculating another via-point for considering the fellow passenger is repeatedly performed, which is identical to the aforementioned process.

As described above, different starting places of the driver and the fellow passenger are inputted together along with the common destination of the driver and the fellow passenger, and preferred traffic information for the movement of the fellow passenger to the selected via-point is inputted, so that the driver may receive guidance of the optimum via-point, at which the fellow passenger conveniently takes the vehicle to reach the destination within a short time, within the travelling route from the starting place to the destination of the driver.

The contents of the disclosure have been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A navigation system including a control unit being configured to perform a method of setting a via-point, in which the control unit of the navigation system is configured to:
    input a plurality of starting places including a starting place of a driver and a starting place of a fellow passenger;
    receive an indication of a selection of a plurality of via-points;
    when the starting place of the fellow passenger is selected as a first via-point of the plurality of via-points, search for a first travelling route including the first via-point from the starting place of the driver to a destination of the driver; and
    when the starting place of the fellow passenger is not selected as the first via-point, input information about public transportation means for movement of the fellow passenger from the starting place of the fellow passenger to a second via-point of the plurality of via-points, and calculate an optimum via-point as the second via-point based on the inputted information to be included within a second travelling route from the starting place of the driver to the destination of the driver.

2. The navigation system of claim 1, wherein when the control unit calculates the optimum via-point, the control unit is further configured to:
    input the information about the public transportation means for movement of the fellow passenger from the starting place of the fellow passenger to the second via-point, the number of times of transit of the public transportation means, and an allowed via-point radius based on a basic recommended route;
    search for the second travelling route from the starting place of the driver to the destination of the driver;
    obtain public transportation means information indicating a public transportation means within the second travelling route from the starting place of the driver to the destination of the driver; and
    compare the obtained public transportation means information with the inputted information about the public transportation means, and inquire and select the optimum via-point as the second via-point for the fellow passenger.

3. The navigation system of claim 2, wherein when the control unit inquires and selects the optimum via-point, the control unit is further configured to:
    select a position based on the public transportation means and the number of times of transit to the second via-point for the fellow passenger within the allowed via-point radius from the basic recommended route among the obtained public transportation means information as the optimum via-point.

4. The navigation system of claim 1, wherein after the control unit calculates the optimum via-point, the control unit is further configured to:
    when it is determined that the selected optimum via-point is appropriate, display information relating to the public transportation means and the transit of the public transportation means on a screen of the navigation system together with the position of the optimum via-point, and display a travelling route including the optimum via-point on the screen of the navigation system.

5. The navigation system of claim 1, wherein after the control unit calculates the optimum via-point, the control unit is further configured to:
    notify the fellow passenger of the optimum via-point, the public transportation means for the movement to the optimum via-point, and a time taken to the optimum via-point.

6. The navigation system of claim 1, wherein after the control unit calculates the optimum via-point, the control unit is further configured to:
    when it is determined that the selected optimum via-point is inappropriate, display information on public transportation means and the transit of the public transportation means included in an alternative via-point on a screen of the navigation system together with a position of the alternative via-point, and display a travelling route including the alternative via-point on the screen of the navigation system.

7. The navigation system of claim 6, wherein after the control unit calculates the optimum via-point, the control unit is further configured to:
    when it is determined that the selected optimum via-point is inappropriate, notify the fellow passenger of the alternative via-point, the transportation means for the movement to the alternative via-point, and the time taken to the alternative via-point.

8. The navigation system of claim 6, wherein the control unit is further configured to:
    when the fellow passenger is not satisfied with the alternative via-point, re-input the allowed via-point radius based on the basic recommended route, and calculate another via-point for the fellow passenger.

9. A non-transitory computer readable medium containing program instructions for setting a via-point in a navigation system, the computer readable medium comprising:
    program instructions that input a plurality of starting places including a starting place of a driver and a starting place of a fellow passenger;
    program instructions that receive an indication of a selection of a plurality of via-points;
    program instructions that search, when the starting place of the fellow passenger is selected as a first via-point of the plurality of via-points, for a first travelling route including the first via-point from the starting place of the driver to a destination of the driver; and
    program instructions that input, when the starting place of the fellow passenger is not selected as the via-point, information about public transportation means for movement of the fellow passenger from the starting place of the fellow passenger to a second via-points of the plurality of via-points, and calculate an optimum via-point as the second via-point based on the inputted information to be included within a second travelling route from the starting place of the driver to the destination of the driver.

* * * * *